Dec. 27, 1966  W. D. LUDWIG ETAL  3,294,106
SHUTTLE VALVE WITH INTEGRATED DETENT MEANS
Filed May 13, 1963  2 Sheets-Sheet 1
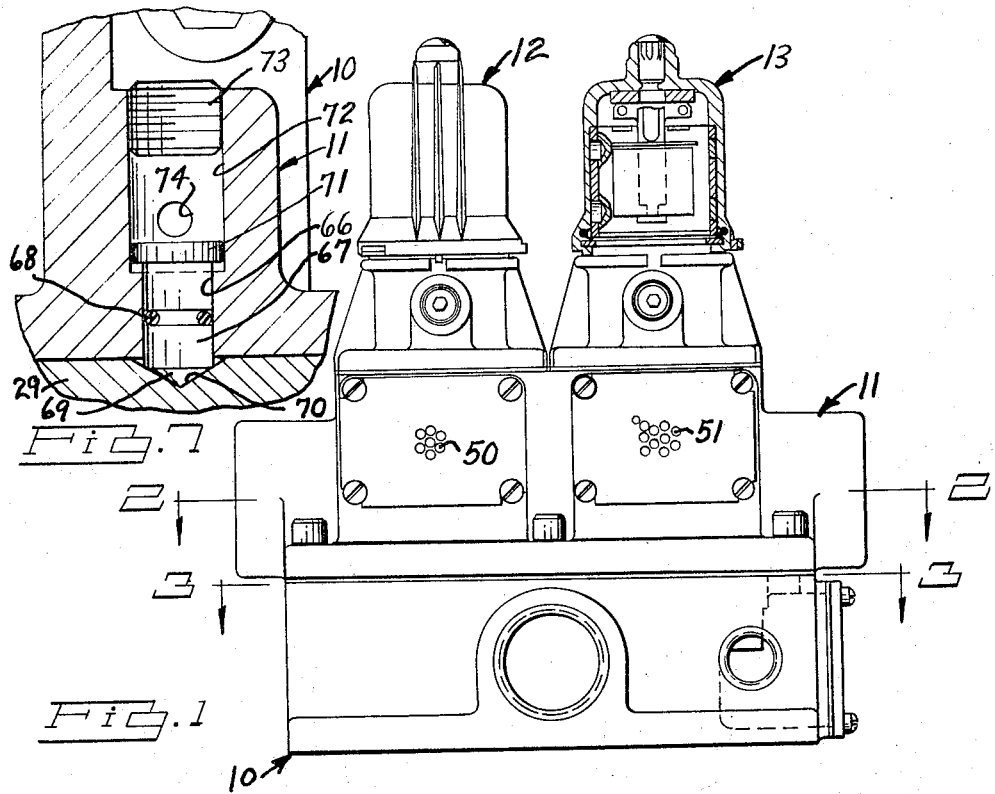
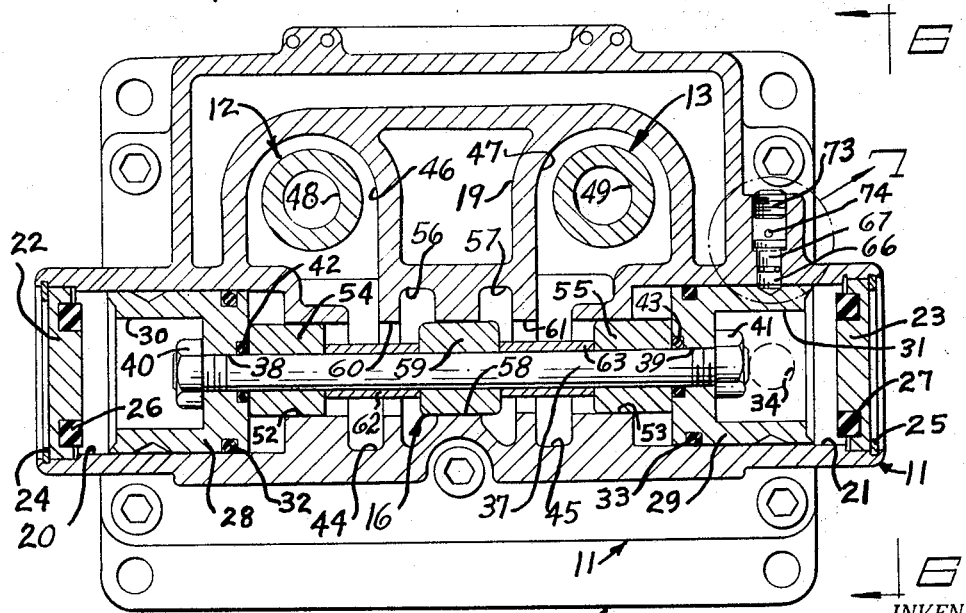
INVENTORS.
WALTER D. LUDWIG
WALTER J. BOWMAN
BY
Donnelly, Mentag & Harrington
ATTORNEYS

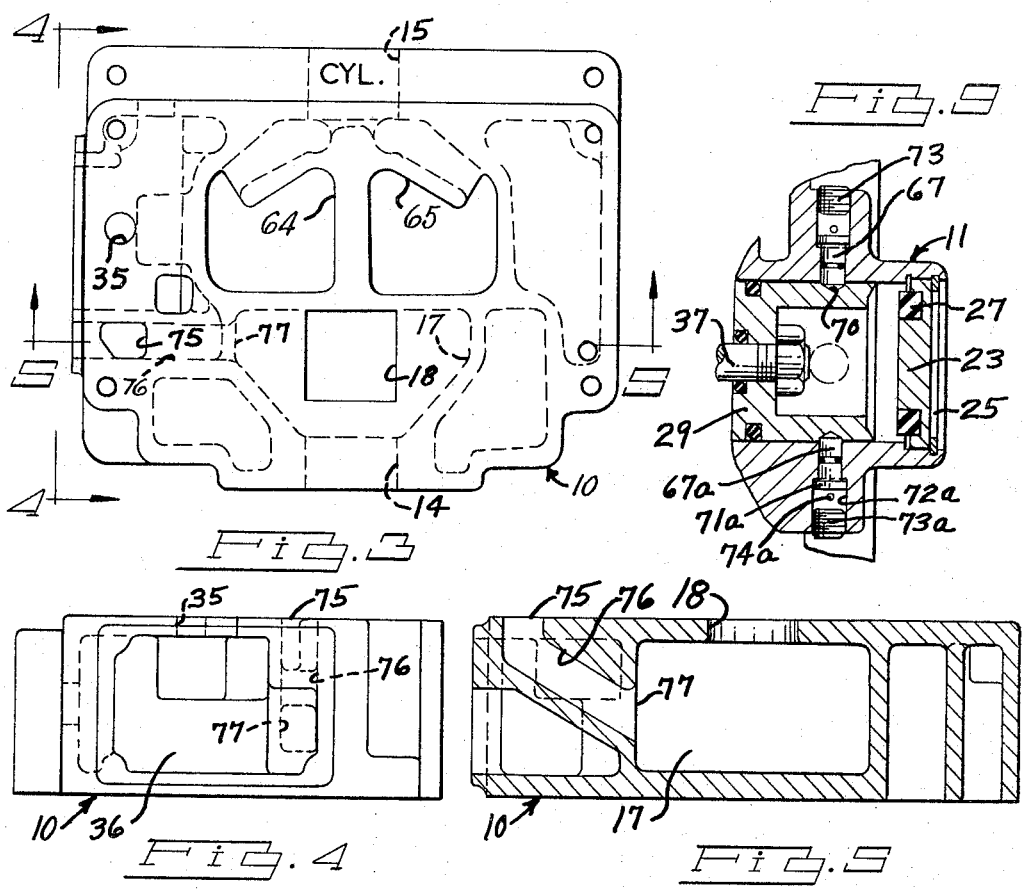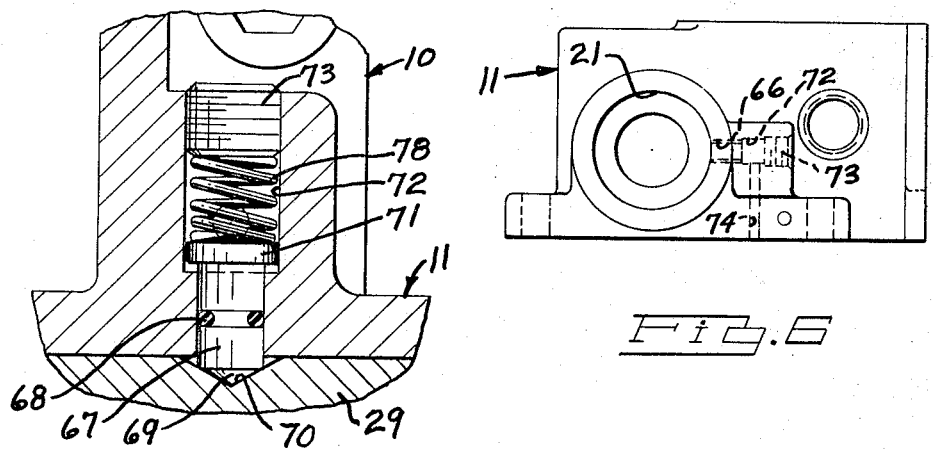

United States Patent Office
3,294,106
Patented Dec. 27, 1966

3,294,106
SHUTTLE VALVE WITH INTEGRATED
DETENT MEANS
Walter D. Ludwig, Bloomfield Township, Oakland County, and Walter J. Bowman, Detroit, Mich., assignors to Mac Valves, Inc., Detroit, Mich., a corporation of Michigan
Filed May 13, 1963, Ser. No. 279,840
4 Claims. (Cl. 137—110)

This invention relates generally to air valves, and more particularly to an improved variable pressure detent means for use in controlling the operation of a shuttle valve of a press safety valve.

The present invention is an improvement over the structure disclosed in the patent to Ludwig et al. No. 3,089,503. As pointed out in that patent it is conventional practice to provide presses, and the like, with safety valves which incorporate a pair of master flow control valves which are connected in parallel so as to feed the operating pressure fluid through a pair of parallel conduits which are adapted to feed into the opposite ends of a press inlet shuttle valve or poppet valve so as to hold the shuttle valve in a balanced or centered position when both of the master flow control valves are functioning correctly. If one of the master flow control valves fails the pressure fluid from the remaining operative master flow control valve unbalances the shuttle valve and it is moved in one direction or the other to block the flow of operating pressure fluid from the remaining operative master flow control valve and exhaust it to the atmosphere. As a practical matter, the two master flow control valves do not operate at absolutely identical times, and in many instances the shuttle valve will be moved from the balanced or centered condition and operate an alarm when there has been no failure of the flow control valves. Such safety valves are also used over a broad range of pressure applications and under conditions it is necessary that the shuttle valve stay in its centered or balanced position without moving to the failure indicated position when a failure has not actually occurred. Also, it has been found that variations in supply line pressure cause the shuttle valves of such safety valves to flutter and this is a disadvantage. Accordingly, it is the primary object of the present invention to provide a novel and improved variable pressure detent means for a shuttle valve of a press safety valve or the like which will provide the shuttle valve with a compensating or dampening mechanism to aid the shuttle valve in carrying out its normal function without fluttering, and without being moved into a false, failure indicating position.

It is another object of this invention to provide a variable pressure detent means which may be built into the shuttle valve housing of a press safety valve and be operated by the pressurized operating fluid alone or in conjunction with a spring.

It is a further object of this invention to provide a variable pressure detent means which is sensitive at any operating pressure and capable of functioning to restrain fluttering of a press safety shuttle valve equally well at high and low pressures.

It is still another object of the present invention to provide a safety valve shuttle valve with a detent means comprising at least one detent piston slidably mounted in the shuttle valve housing and wherein the detent piston is adapted to operatively engage a peripheral groove in one of the shuttle valve pistons and be releasably held therein by either pressure fluid operating alone or in conjunction with a spring means.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 1 is an elevational view of a press safety valve provided with detent means in accordance with the principles of the present invention;

FIG. 2 is an enlarged, horizontal sectional view of the valve structure illustrated in FIG. 1, taken along the line 2—2 thereof, and looking in the direction of the arrows;

FIG. 3 is a horizontal sectional view of the valve base member shown in FIG. 1, taken along the line 3—3 thereof, looking in the direction of the arrows, and with the base turned 180°;

FIG. 4 is a left side elevational view of the valve base member illustrated in FIG. 3, taken along line 4—4 thereof, and looking in the direction of the arrows;

FIG. 5 is an elevational sectional view of the valve base member illustrated in FIG. 3, taken along the line 5—5 thereof, and looking in the direction of the arrows;

FIG. 6 is a reduced right end elevational view of the valve structure illustrated in FIG. 2, with parts removed, taken along the line 6—6 thereof, and looking in the direction of the arrows;

FIG. 7 is an enlarged fragmentary view of the valve structure of FIG. 2 which is shown within the circle marked "7";

FIG. 8 is a view similar to FIG. 7 and showing a modified detent means which may be employed in carrying out the principles of the invention; and FIG. 9 is a fragmentary horizontal sectional view of one end of the shuttle valve of a press valve which is provided with a plurality of detent means made in accordance with the principles of the present invention.

Referring now to the drawings and in particular to FIGS. 1 through 7, wherein is shown an illustrative embodiment of a press safety valve incorporating the novel variable pressure detent means of the present invention, the numeral 10 generally indicates the base member of a press valve on which is mounted a shuttle valve housing generally indicated by the numeral 11. A press safety valve of the type incorporating a shuttle valve which may be provided with the variable pressure detent means of the present invention is illustrated in U.S. Patent 3,051,187, entitled Press Safety Valve, and which issued on August 28, 1962. The numerals 12 and 13 generally indicate pilot operated flow valves for controlling the flow of pressurized fluid through the shuttle valve. The valves 12 and 13 form no part of the present invention and accordingly they have not been shown in detail. However, suitable pilot operated flow valves of the type indicated by the numerals 12 and 13 are shown in detail in the patent application of Walter J. Bowman, entitled Pilot Operated 3-Way In-Line Valve, Serial No. 241,188, filed in the U.S. Patent Office on November 30, 1962, and now U.S. Patent No. 3,238,972.

As shown in FIG. 3, the press safety valve is provided with a fluid pressure inlet 14 and a fluid pressure outlet 15. The flow of pressurized fluid out of the valve is controlled by the shuttle valve generally indicated by the numeral 16 in FIG. 2. Fluid under pressure is adapted to enter the valve base 10 through the inlet 14 and into the chamber 17 from where it passes upwardly through the port 18 into the passage 19 and into appropriate fluid passages in the flow control valves 12 and 13. The valves 12 and 13 provide a pair of flow paths for feeding operating fluid pressure to the shuttle valve 16 whereby, when the shuttle valve 16 is maintained in the centered position shown in FIG. 2, the operating fluid will pass down into the base 10 and out through the outlet 15 and to the press cylinder, which is to be operated by the fluid. The dual flow paths for the pressure fluid through the shuttle valve structure will now be described in detail.

As shown in FIG. 2, the shuttle valve housing 11 is provided with the aligned piston chambers 20 and 21 at opposite ends thereof. The outer ends of the chambers 20 and 21 are open. Detachably mounted in the open ends of the chambers 20 and 21 are the retainer members 22 and 23, respectively, and they are secured in place by suitable retainer clip rings as 24 and 25. The retainers 22 and 23 are provided on the inner side thereof with suitable annular cushion members as 26 and 27. The shuttle valve 16 includes a pair of shuttle valve pistons 28 and 29 which are slidably mounted in the chambers 20 and 21, respectively. As shown in FIG. 2, the pistons 28 and 29 are provided with axial inwardly extending recesses 30 and 31 and with suitable O-ring sealing means, 32 and 33, respectively. The piston chamber 21 is provided with a vent passage 34 which communicates with the port 35 in the base 10. The port 35 communicates with the chamber 36 which is open to the atmosphere.

As shown in FIG. 2, the shuttle valve 16 includes the elongated rod 37 which interconnects the pistons 28 and 29. The piston 28 is provided with the axial hole 38 through which is mounted one threaded end of the rod 37. The other end of the rod 37 is threaded and passes through a similar axial hole 39 in the piston 29. The rod 37 is fixedly secured to the pistons 28 and 29 by means of the lock nuts 40 and 41, respectively. Mounted in the pistons 28 and 29 and disposed around the rod 37 are the O-ring sealing means 42 and 43.

The shuttle valve housing 11 is provided with the spaced apart shuttle valve chambers 44 and 45 which communicate with the cylinder supply chambers 46 and 47 of the valves 12 and 13, respectively. The cylinder supply chambers 46 and 47 are connected through the structure of the valve 12 and 13 with the passages 48 and 49 of the valves 12 and 13 which are in turn adapted to be selectively connected to the valve inlet passage 19 or to the exhaust outlets 50 and 51 of the valves 12 and 13 as shown in FIG. 1.

As shown in FIG. 2, the piston chamber 20 is interconnected with the chamber 44 by means of the bore 52. The piston chamber 21 is similarly connected to the chamber 45 by means of the bore 53. Mounted on the outer ends of the shuttle valve rod 37 are the annular valve members 54 and 55 which are slidably mounted in the bores 52 and 53, respectively, as shown in FIG. 2. The shuttle valve housing is further provided with the outlet chambers 56 and 57 which are spaced apart and which are centrally located in the housing 11. The chambers 56 and 57 are interconnected by the bore 58 in which is slidably mounted the shuttle valve member 59. The supply chamber 46 is connected to the chamber 56 by means of the bore 60. The chamber 45 is similarly connected to the chamber 57 by means of the bore 61. The valve members 54, 55 and 59 are maintained in operating spaced apart positions on the rod 37 by means of the spacer sleeves 62 and 63. The shuttle valve chambers 56 and 57 communicate with the base chambers 64 and 65, respectively, as shown in FIG. 3. The chambers 64 and 65 are both connected to the valve outlet 15. It will be seen that when the shuttle valve 16 is in the centered position shown in FIG. 2, there are two flow paths provided through the valve for conveying pressurized fluid to the cylinder of the press to be controlled. Pressurized fluid will flow through the valve 12 and into the inlet chamber 46 and into the chamber 44 and thence through the bore 60 and into the chamber 56. Fluid will also pass through the valve 13 and into the chamber 47 and thence to the chamber 45 and through the bore 61 and into the chamber 57.

It will be seen that if either one of the master flow control valves 12 or 13 fails, the fluid pressure in the inlet chambers 46 or 47 will be cut off, whereby the pressure acting on one of the shuttle valve pistons 28 or 29 will also be cut off and the shuttle valve 16 will be unbalanced and moved in one direction or the other so as to close off the bore 60 or 61 and cut off the pressurized fluid to the press to be operated. When the master flow control valves 12 and 13 are functioning properly, the air pressures exerted on the shuttle valve pistons 28 and 29 are equal and the shuttle valve 16 will be maintained in the center position shown in FIG. 2. Press valves of the type used for high pressure and low pressure conditions must be operative under these conditions and stay centered in the position shown in FIG. 2 under all operative pressure conditions. In practical operation, the master flow control valves 12 and 13 do not always operate at the same identical time, and such lack of simultaneous operation causes the shuttle valve 16 to flutter in its operation and this is a disadvantage. FIGS. 2 and 7 show the shuttle valve 16 provided with a variable pressure detent means made in accordance with the principles of the present invention to overcome the tendency of the shuttle valve to flutter.

As shown in FIGS. 2 and 7, the shuttle valve housing 11 is provided with a detent means which is adapted to operatively engage the shuttle valve piston 29. A detent bore 66 is formed in the housing 11 in a direction transverse to the longitudinal axis of the shuttle valve 16. The detent bore may be also be termed as being disposed on the periphery of the shuttle valve piston chamber 21 in a radially disposed position. The detent bore 66 opens into the piston chamber 21 at its inner end. As best seen in FIG. 7, a detent piston 67 is slidably mounted in the detent bore 66 and it is provided with a suitable O-ring sealing means 68. The inner end 69 of the detent piston 67 is formed as a cone or point for releasable holding engagement in the annular V-shaped groove 70 which is formed on the periphery of the shuttle valve piston 29. The detent piston 67 is provided with an enlarged head 71 on the outer end thereof and this head is slidably mounted in the communicating aligned enlarged detent piston bore 72 which is enclosed at its outer end by the threaded plug 73.

As shown in FIGS. 2, 6 and 7, the pressure fluid passage 74 is formed in the housing 11 and it extends from the lower side of the housing 11 upwardly to the detent piston enlarge bore 72. The fluid passage 74 is disposed over the port 75 which is the upper end of the pressure fluid passage 76 in the base 10. The fluid passage 76 terminates in the port 77 which opens into the pressure fluid chamber 17. See FIGS. 3, 5 and 6.

It will be seen that the detent piston 67 will always be biased inwardly into engagement with the groove 70 whenever the supply chamber 17 is provided with fluid under pressure. The inwardly directed radial force exerted on the detent piston 67 is proportional to the pressure of the operating fluid. That is, as the operating pressure in the supply chamber 17 varies the force exerted on the detent piston 67 varies and in turn the force it exerts on the shuttle valve piston 29 varies. It will be seen that based on the diameter of the detent piston head 71 and the operating air pressure, a certain force is created at any given air pressure to prevent accidental shifting of the shuttle valve 16 either to the right or to the left as viewed in FIG. 2. The detent piston 67 functions to prevent super-sensitivity of the shuttle valve 16, yet permits the shuttle valve to operate in a fail safe manner. When either of the master flow control valves 12 or 13 fails, the differential force of the air pressure exerted on either the shuttle valve pistons 28 or 29 is strong enough to overcome any detent action provided by the detent piston 67.

FIG. 8 shows a slight modification of the invention wherein a spring 78 is provided in the detent piston bore 72. The spring 72 facilitates assembly of the entire valve assembly and also aids in initial positioning of the detent piston 67 in the groove 70 in the shuttle valve piston 29.

The spring 78 is also preferably used when the press valve is operating on low pressure fluid and when external pilot pressure fluid is employed for operating the pilots for the flow valves 12 and 13.

FIG. 9 shows a further modification of the invention wherein a plurality of detent pistons as 67 and 67a are provided. The second piston 67a is diametrically disposed relative to the piston 67 and is constructed in the same manner as piston 67. The similar parts are marked with the same reference numerals followed by the small letter "a." The fluid passage 74a would be connected to the supply chamber 17 by a passage similar to the passage 76. It will be understood that while only two detent pistons are illustrated in FIG. 9 additional detent pistons may be mounted in the housing 11 around the chamber 21 and in evenly disposed radial positions.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What we claim is:

1. In a safety valve of the type having a pair of inlet pressure fluid chambers and a base provided with a pressure fluid supply chamber and a shuttle valve housing having a shuttle valve bore in which is operatively mounted a shuttle valve including a spool provided with a centrally mounted valve head and a piston of equal area at each end for engagement by fluid under pressure provided by said fluid chambers, to maintain the shuttle valve in a central operative balanced position, said valve including an outlet closable by said valve head when it is moved from said balanced central position, a variable pressure detent means comprising, a detent piston mounted in said shuttle valve housing for movement transverse to the longitudinal axis of the shuttle valve; one of said shuttle valve pistons having a V-shaped groove formed on the periphery thereof; said detent piston having a pointed inner end extendable into said shuttle valve bore and into releasable engagement with said V-shaped groove on said one of said shuttle valve pistons and, passage means through said base and shuttle valve housing interconnecting said pressure fluid supply chamber and said detent piston for normally moving said detent piston pointed inner end into operative engagement with said V-shaped groove on said shuttle valve piston, said detent piston being automatically adjustable to variations in the operating pressure of said safety valve whereby the inwardly directed transverse force exerted on said detent piston is directly proportioned to the pressure of the operating fluid, so that as the operating pressure in said pressure fluid supply chamber varies the force exerted on said detent piston varies and therefore the force it exerts on said shuttle valve piston varies.

2. The structure defined in claim 1, wherein: said detent piston is mounted in a bore in said shuttle valve housing which is disposed transversely relative to the longitudinal axis of the shuttle valve and said bore is interconnected with the pressure fluid supply chamber.

3. The structure as defined in claim 2, wherein: said detent means includes a spring mounted in said bore and adapted to normally bias said detent piston into said groove.

4. The structure as defined in claim 1, wherein: said detent means includes a plurality of pointed detent pistons radially spaced around the said one shuttle valve piston.

References Cited by the Examiner

UNITED STATES PATENTS

| | | | |
|---|---|---|---|
| 2,795,238 | 6/1957 | Hirsch | 251—94 X |
| 3,018,786 | 1/1962 | Stratton | 251—297 X |
| 3,051,187 | 8/1962 | Ludwig | 137—110 |
| 3,072,149 | 1/1963 | Hasbany | 251—297 X |

WILLIAM F. O'DEA, *Primary Examiner.*

ISADOR WEIL, *Examiner.*

D. ZOBKIW, *Assistant Examiner.*